United States Patent
Guen

(10) Patent No.: US 8,642,196 B2
(45) Date of Patent: Feb. 4, 2014

(54) RECHARGEABLE BATTERY

(75) Inventor: Min-Hyung Guen, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 276 days.

(21) Appl. No.: 13/210,124

(22) Filed: Aug. 15, 2011

(65) Prior Publication Data

US 2012/0315515 A1 Dec. 13, 2012

Related U.S. Application Data

(60) Provisional application No. 61/494,743, filed on Jun. 8, 2011.

(51) Int. Cl.
*H01M 2/12* (2006.01)

(52) U.S. Cl.
USPC ................... 429/56; 429/53; 429/59

(58) Field of Classification Search
USPC ............................. 429/53, 56, 59
See application file for complete search history.

(56) References Cited

U.S. PATENT DOCUMENTS

| | | | |
|---|---|---|---|
| 6,403,250 B1* | 6/2002 | Azema et al. ................... | 429/53 |
| 2007/0269711 A1* | 11/2007 | Meguro et al. .................. | 429/94 |
| 2010/0167107 A1* | 7/2010 | Byun et al. ...................... | 429/56 |
| 2010/0279156 A1 | 11/2010 | Kim et al. | |
| 2011/0039136 A1* | 2/2011 | Byun et al. ...................... | 429/56 |

FOREIGN PATENT DOCUMENTS

| | | |
|---|---|---|
| EP | 2 284 932 A1 | 2/2011 |
| EP | 2 299 512 A1 | 3/2011 |
| JP | 11-40203 | 2/1999 |
| JP | 2000-082457 | 3/2000 |
| KR | 10-2011-0005197 A | 1/2011 |

OTHER PUBLICATIONS

Patent Abstracts of Japan, with Machine English translation of entire patent, for JP 2000-082457; Published Mar. 21, 2000; in the name of Fujii et al., 13 pages.
European Search Report dated Sep. 21, 2012 for European Patent Application No. 11178263.7, 7 pages.

* cited by examiner

*Primary Examiner* — Basia Ridley
*Assistant Examiner* — James Erwin
(74) *Attorney, Agent, or Firm* — Christie, Parker & Hale, LLP

(57) ABSTRACT

A rechargeable battery according to an exemplary embodiment includes an electrode assembly having a positive electrode and a negative electrode, a case in which the electrode assembly is installed, a cap plate coupled with the case, a short-circuit member provided in a short-circuit hole formed in the cap plate and deformed to electrically connect the positive electrode and the negative electrode, and a valve member provided under the short-circuit hole and controlling connection between an internal space of the case and the short-circuit hole.

20 Claims, 6 Drawing Sheets

RECHARGEABLE BATTERY

BACKGROUND

1. Field

The described technology relates generally to a rechargeable battery. More particularly, the described technology relates generally to a rechargeable battery having an improved safety apparatus.

2. Description of the Related Art

A rechargeable battery differs from a primary battery in that it can be repeatedly charged and discharged, while the latter makes only the irreversible conversion of chemical to electrical energy. The low-capacity rechargeable battery is used as the power supply for small electronic devices, such as cellular phones, notebook computers and camcorders, while the high-capacity rechargeable battery is used as the power supply for driving motors in hybrid vehicles and the like.

Recently, a high power rechargeable battery that includes a non-aqueous electrolyte having a high energy density has been developed, and is constituted by a large capacity rechargeable battery in which a plurality of rechargeable batteries are coupled in series in order to use it to drive devices requiring a large amount of power, for example, motors such as for electric vehicles.

In addition, a large capacity rechargeable battery generally includes a plurality of rechargeable batteries that are coupled in series, and the rechargeable battery may be formed of cylindrical and angular shapes.

If overcurrent flows through the rechargeable battery having a case that is made of material such as metal, the temperature of the rechargeable battery increases so that the rechargeable battery may be exploded or fired.

SUMMARY

The described technology has been made in an effort to provide a rechargeable battery improved in safety.

A rechargeable battery according to an exemplary embodiment includes an electrode assembly having a positive electrode and a negative electrode, a case in which the electrode assembly is installed, a cap plate coupled with the case, a short-circuit member provided in a short-circuit hole formed in the cap plate and deformed to electrically connect the positive electrode and the negative electrode, and a valve member provided under the short-circuit hole and controlling connection between an internal space of the case and the short-circuit hole.

The valve member may be set to be opened at a predetermined pressure, an opening pressure of the valve member may be set to be higher than a deformation pressure of the short-circuit member, and the opening pressure of the valve member may be 1.05 to 1.5 times of the deformation pressure of the short-circuit member. In addition, when a portion of the short-circuit member, protruding downward inversely protruding upward, the short-circuit member may be set to electrically connect the positive electrode and the negative electrode.

A terminal electrically connected with the electrode assembly and thus protruding to the outside of the case penetrates the cap plate, a lower insulation member that insulates the terminal and the cap plate may be provided in a lower side of the cap plate, a lower hole connected with a short-circuit hole formed in the cap plate may be formed in the lower insulation member, and the valve member may be provided in the lower hole. The valve member may be integrally formed with the lower insulation member, and the valve member may be formed of a film fixed to the lower insulation member.

A sealing member formed along a circumference direction of the short-circuit hole may be provided between the lower insulation member and the cap plate, the valve member may be formed of a film fixed to an upper end of the lower insulation member, and a sealing protrusion protruding between the lower insulation member and the cap plate may be formed along a circumference direction of the short-circuit hole in the valve member.

The valve member may include a notch, the valve has a convex shape protruding to the inside of the case, and the shape of the short-circuit member is deformed to protrude to the outside of the case so as to electrically connect the positive electrode and the negative electrode of the electrode assembly each other.

A short-circuit tab electrically connected with one of the positive electrode and the negative electrode may be provided on the cap plate, and the short-circuit tab and the short-circuit member may be formed to contact each other when the short-circuit member is deformed.

A hole is formed in a portion of the short-circuit tab corresponding to the short-circuit hole, and a short-circuit protrusion protruding toward the short-circuit member may be formed along a circumference of the hole of the short-circuit tab.

The cap plate may be electrically connected with the positive electrode, the short-circuit tab may be electrically connected with the negative electrode, the short-circuit member may be electrically connected with the short-circuit tab due to deformation thereof while in the state of being electrically connected with the negative electrode, the cap plate may be electrically connected with the negative electrode, the short-circuit member may be electrically connected with the positive electrode, and the short-circuit member may be electrically connected with the short-circuit tab due to deformation thereof while in the state of being connected with the cap plate.

Accordingly to the exemplary embodiment, the valve member can maintain a fuse member to be in a short-circuit state when a short-circuit occurs due to an overcurrent so that safety of the rechargeable battery can be improved.

DETAILED DESCRIPTION

Figure 1:
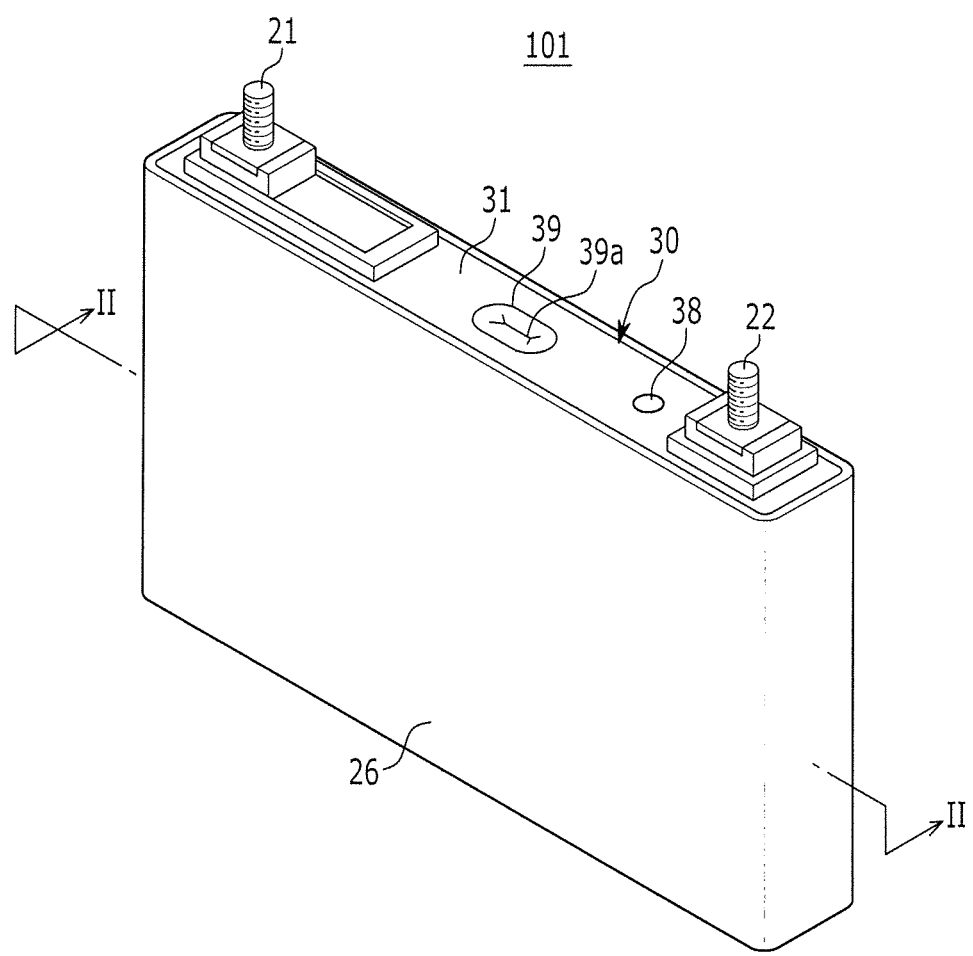
FIG. 1 is a perspective view of a rechargeable battery according to a first exemplary embodiment.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings and description, like reference numerals designate like elements throughout the specification.

Figure 2:
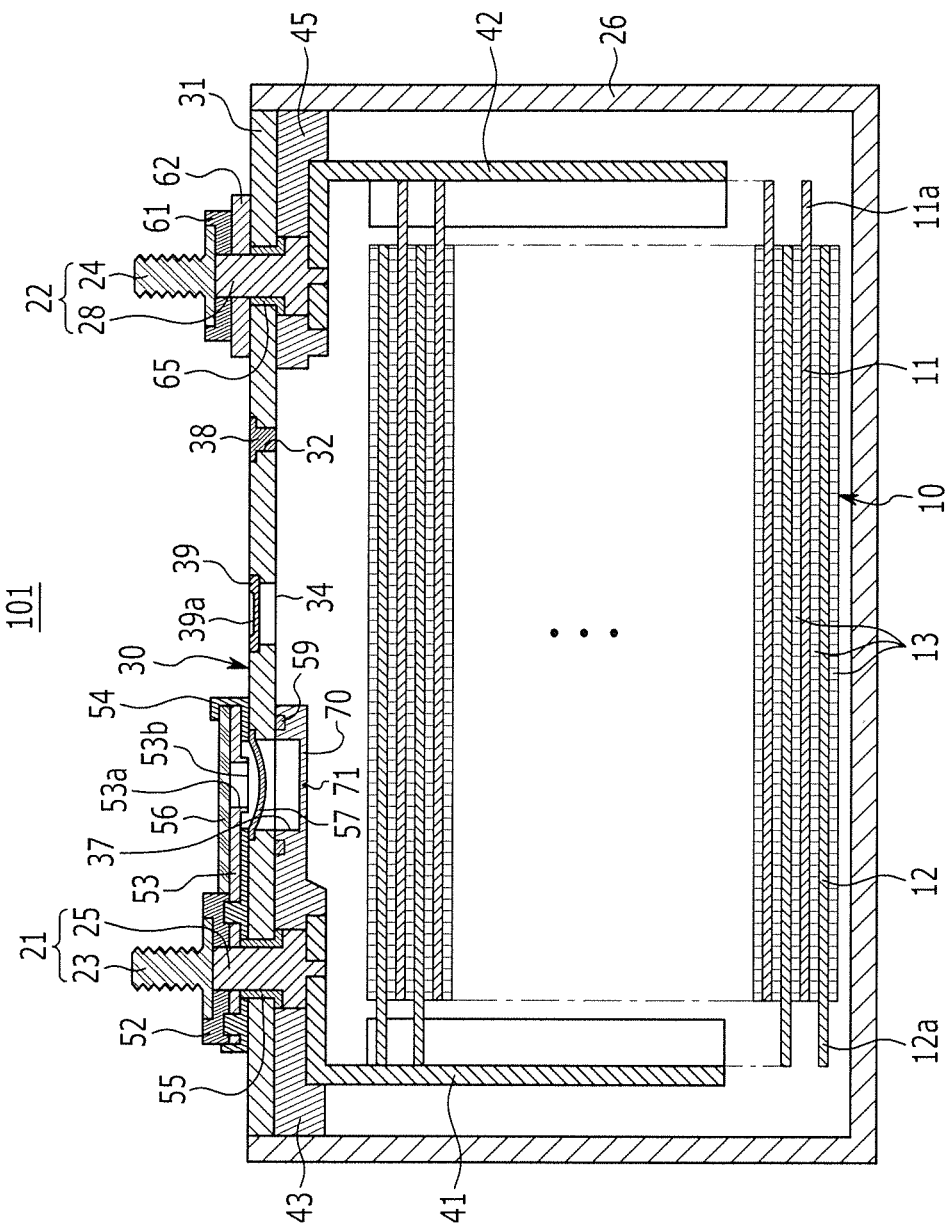
FIG. 2 is a cross-sectional view of FIG. 1, taken along the line II-II.

FIG. 1 is a perspective view of a rechargeable battery according to a first exemplary embodiment and FIG. 2 is a cross-sectional view of FIG. 1, taken along the line II-II.

Referring to FIG. 1 and FIG. 2, a rechargeable battery 101 according to the first exemplary embodiment includes an electrode assembly 10 that is wound by interposing a separator 13 between a positive electrode 11 and a negative electrode 12, a case 26 in which the electrode assembly 10 is installed, and a cap assembly 30 coupled to an opening of the case 26.

The rechargeable battery 101 according to the first exemplary embodiment is illustrated as a square-shaped lithium ion rechargeable battery. However, the embodiment of the present invention is not limited thereto, and it can be applied to various shaped of batteries such as a lithium polymer battery or a cylindrical battery.

The positive electrode 11 and the negative electrode 12 include a coated region where an active material is coated on a current collector formed of a thin metal foil and uncoated regions 11a 12a where the active material is not coated. The positive electrode uncoated region 11a is formed at one side end of the positive electrode 11 along a length direction thereof, and the negative uncoated region 12a is formed at the other side end of the negative electrode along a length direction thereof negative electrode 12. The positive electrode 11 and the negative electrode 12 are spirally-wound by interposing the separator 13, which is an insulator, therebetween.

However, the embodiment of the present invention is not limited thereto, and the electrode assembly 10 may have a structure where a positive electrode and a negative electrode, respectively formed of a plurality of sheets are layered, interposing a separator therebtween.

The case 26 is substantially formed in the shape of a cuboid, and an opening is formed in one side thereof. The case 26 may be formed with a metal such as aluminum, stainless steel, and the like.

The cap assembly 30 includes a cap plate 31 covering the opening of the case 26, a first terminal 21 protruding to the outside of the cap plate 31 and electrically connected with the positive electrode 11, and a second terminal 22 protruding to the outside of the cap plate 31 and electrically connected with the negative electrode 12.

The cap plate 31 is formed in the shape of a plate extended in one direction, and coupled to the opening of the case 26. The cap plate 31 includes a sealing cap 38 provided in an electrolyte injection opening 32 and a vent plate 39 having a notch 39a set to be opened at a predetermined pressure. The 39a is formed in the vent hole 34.

The first terminal 21 and the second terminal 22 protrude upward of the cap plate 31.

The first terminal 21 is electrically connected to the negative electrode 12 through a current collecting tab 41, and the second terminal 22 is electrically connected to the positive electrode 11 through the current collecting tab 41. However, the embodiment of the present invention is not limited thereto. The first terminal 21 may be electrically connected to the positive electrode and the second terminal 22 may be electrically connected to the negative electrode.

Figure 3:
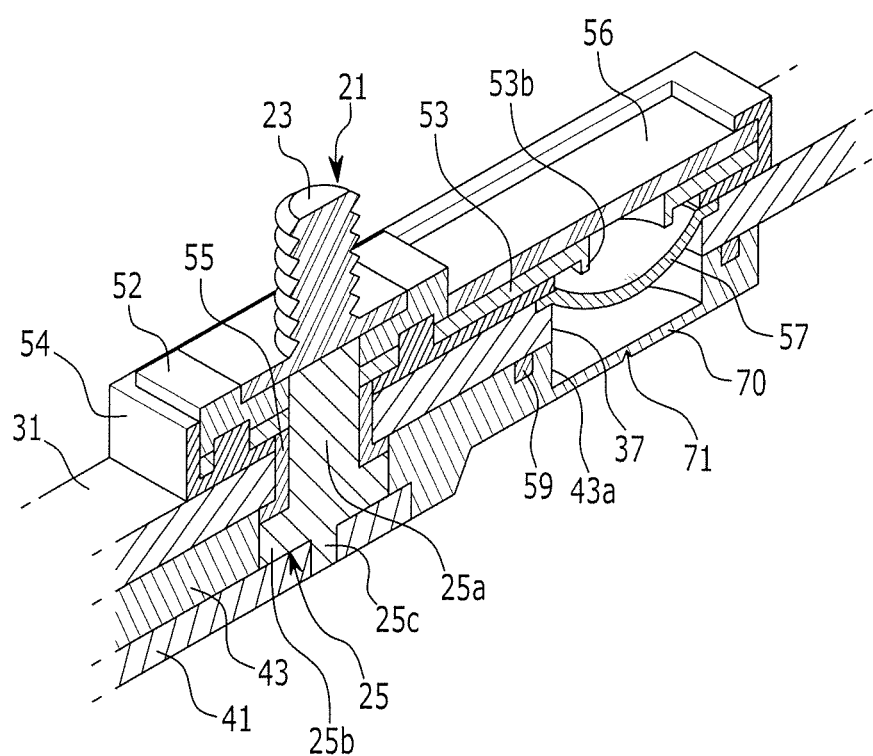
FIG. 3 is a partially cut-away perspective view of the rechargeable battery according to the first exemplary embodiment.

As shown in FIG. 3, the first terminal 21 includes an externally exposed outer terminal 23 and a connection terminal 25 disposed under the outer terminal 23 and joined to the current collecting tab 41. The outer terminal 23 is formed in the shape of a circular cylinder having a screw thread formed in an external circumference thereof. The connection terminal 25 includes a column portion 25a, a lower flange 25b, and a lower protrusion 25c. The column portion 25a penetrates the cap plate 31 and an upper end thereof contacts the outer terminal 23 and thus fixed thereto, the lower flange 25b protrudes to the outside from a lower end of the column portion 25a, and the lower protrusion 25c protrudes downward from the lower end of the column portion 25a, inserted to the current collecting tab 41, and then fixed thereto by welding. A gasket 55 provided between the first terminal 21 and the cap plate 31 for sealing is inserted a hole through which the terminal is penetrated, and a lower insulation member 43 is provided under the cap plate 31 for insulation of the first terminal 21 and the current collecting tab 41 from the cap plate 31.

Meanwhile, a short-circuit tab 53 electrically connected to the first terminal 21 is formed on the cap plate 31. An upper insulation member 54 is provided between the short-circuit tab 53 and the cap plate 31 for electrical insulation therebetween. Since the short-circuit tab 53 is electrically connected to the first terminal 21 through a connection tab 52 and the connection tab 52 is disposed under the outer terminal 23, a groove to which a flange formed in the outer terminal 23 is inserted is formed in the connection tab 52 and welded to the outer terminal 23. In addition, the connection terminal 25 is inserted to a lower portion of the connection tab 52 and the outer terminal 23 is inserted to an upper portion of the connection tab 52.

Referring to FIG. 2, the second terminal 22 includes an externally exposed outer terminal 24 and a connection terminal 28. The outer terminal 24 is formed in the shape of a circular cylinder having a screw thread formed in an external circumference thereof. The connection terminal 28 is welded to a current collecting tab 42 and penetrates the cap plate 31 such that an upper portion of the connection terminal 28 contacts the outer terminal 24 and then fixed thereto. A gasket 64 formed between the second terminal 22 and the cap plate 31 for sealing is inserted to a hole through which the second terminal 22 is penetrated, and a lower insulation member 45 is provided under the cap plate 31 for insulation of the second terminal 22 and the current collecting tab 42 from the cap plate 31.

A connection plate 62 that electrically connects the second terminal 22 and the cap plate 31 is provided in the second terminal 22. Since the second terminal 22 is inserted to the connection plate 62, the connection plate 62 is electrically connected with the second terminal 22 through a connection tab 61 provided in an upper portion of the connection plate 62. The connection tab 61 is provided under the outer terminal 24 and welded thereto. In addition, the connection terminal 28 is inserted to a lower portion of the connection tab 61 and the outer terminal 24 is inserted to an upper portion of the connection terminal 28. With such a structure, the cap plate 31 can be electrically connected with the second terminal 2.

As shown in FIG. 3, the cap assembly 30 includes a short-circuit member 57 that short-circuits the positive electrode 11 and the negative electrode 12. The short-circuit member 57 is electrically connected with the cap plate 31 that is electrically connected to the positive electrode 11, and the short-circuit member 57 is deformed when an internal pressure of the rechargeable battery 101 is increased and thus electrically connected with the short-circuit tab 53 that is electrically connected to the negative electrode 12.

A short-circuit hole 37 is formed in the cap plate 31, and the short-circuit member 57 is disposed between the upper insulation member 54 and the cap plate 31 in the short-circuit hole 37. The short-circuit member 57 may be formed of an arc-shaped portion convex downward and an inverse plate having an edge fixed to the cap plate 31.

An upper hole 53a connected with the short-circuit hole 37 is formed in the short-circuit tab 53, and a reinforcing protrusion 53b protruding downward is formed along a circumference of the upper hole 53a. When the short-circuit tab 53 and the short-circuit member 57 contact each other, the reinforcing protrusion 53b contacts the short-circuit member 57. Thus, when an excessive current flows through the short-circuit tab 53, the short-circuit state can be prevented from being stopped due to melting of the short-tab 53 because the reinforcing protrusion 53b having a large thickness contacts the short-circuit member 57.

A lower hole 43a connected with the short-circuit hole 37 is formed in a lower insulation member 43 and a valve member 70 that blocks the lower hole 43a is provided in the lower hole 43a.

The valve member 70 is set to be opened at a predetermined pressure, and therefore the valve member 70 is opened when the internal pressure of the rechargeable battery 101 is higher than the predetermined pressure. The valve member 70 controls connected between the short-circuit hole 37 and an inner space of the case 26 and the short-circuit hole 37 is blocked with the inner space of the case 26 through the valve member 70. Accordingly, although the internal pressure of the case 26 is increased, a pressure of the short-circuit hole 37 is not increased unit the valve member 70 is broken.

The valve member 70 is disposed in a lower end of the lower hole 43a, and formed in the shape of a plate that is integrally formed with the lower insulation member 43. Further, a notch 71 is formed to be easily opened at the predetermined pressure.

As in the present exemplary embodiment, when the valve member 70 is integrally formed with the lower insulation member 43, the valve member 70 can be formed during a process of forming the lower insulation member 43 such that a process for forming the valve member 70 can be omitted and the valve member 70 and the lower insulation member 43 can be simultaneously formed through insert injection. Further, since the valve member 70 is formed in the shape of a plate where the notch 71 is formed, variation of operation pressure due to variation of elasticity can be prevented.

An elastic member such as a spring may lose elasticity as time laps so that operation problem may occur at a predetermined pressure, but the valve member 70 according to the present exemplary embodiment does not receive pressure at ordinary times and thus the valve member 70 is operable at the predetermined pressure even after the lapses of considerable time.

An opening pressure of the valve member 70 may be set to be higher than a deformation pressure of the short-circuit member 57. In particular, the opening pressure of the valve member 70 may be 1.05 to 1.5 times of that of the deformation pressure of the short-circuit member 57. That is, when the deformation pressure of the short-circuit member 57 is 4.5 kgf, the opening pressure of the valve member 70 may be between 4.725 kgf to 6.75 kgf.

When a portion of the short-circuit member 57, protruding downward is inversed such that the portion protrudes upward, the short-circuit member 57 is electrically connected with the short-circuit tab 53, and thus an inverse pressure has an irregular dispersion range so that an operation pressure cannot be easily set and it may be changed depending on the shape, thickness, after-process, assembling, and management. Therefore, when the operation pressure is changed and thus it is deviated from the dispersion range during an assembling process, the short-circuit member 57 may become inoperable even though the internal pressure of the rechargeable battery 101 is increased. However, according to the present exemplary embodiment, the short-circuit member 57 may be deformed when the valve member 70 is opened by providing the valve member 70 of which an opening pressure is higher than a deformation pressure of the short-circuit member 57. Accordingly, the opening pressure of the valve member 70 may be the deformation pressure of the short-circuit member 57. Since the shape of the valve member 70 is not restrictive, an opening pressure may set to be constant. That is, when the deformation pressure of the short-circuit member 57 is set to be lower than a pressure that substantially causes deformation of the short-circuit 57 and the opening pressure of the valve member 70 is set to be a pressure that substantially causes short-circuit, a pressure at which the short-circuit occurs can be precisely set.

A sealing member 59 is provided between the lower insulation member 43 and the cap plate 31. The sealing member 59 has a ring shape formed by being extended along an edge direction of the shirt-circuit hole 37. The sealing member 59 may be formed with a metal or an elastic material. When a gas is leaked between the lower insulation member 43 and the cap plate 31, the internal pressure of the case 26 cannot be transmitted to the short-circuit member 57 and thus the short-circuit member 57 may be inoperable at a predetermined pressure. However, according to the present exemplary embodiment, the leakage of the gas can be prevented by providing the sealing member 59, and accordingly the short-circuit member 57 can be stably operated at the predetermined pressure.

As described, according to the first exemplary embodiment, when a temperature is increased or an electrolyte solution is dissolved and thus the internal pressure of the rechargeable battery 101 is excessively increased, a current charged in the rechargeable battery 101 discharged by a short-circuit caused by the short-circuit member 57 to thereby prevent explosion or firing of the rechargeable battery 101.

In particular, a space where the short-circuit member 57 contacts the short-circuit tab 53 is separated from a space where the electrolyte solution is provided, and therefore firing of the electrolyte solution due to flame or heat generated from the short-circuit can be stably prevented.

Figure 4:
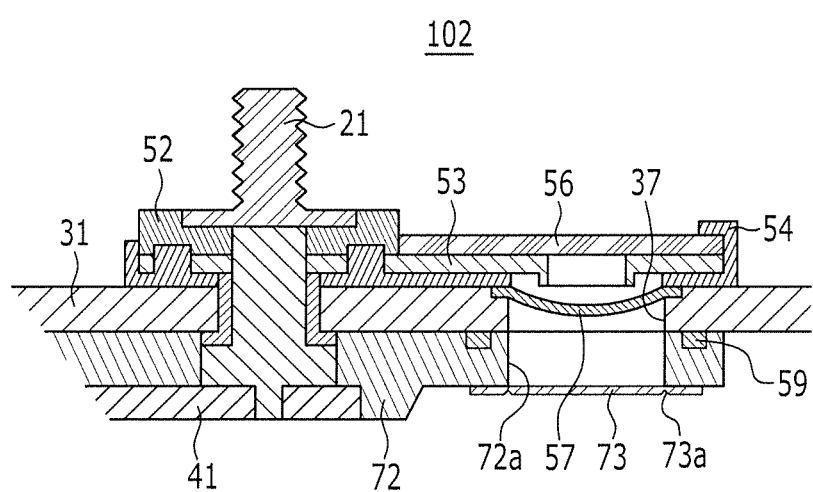
FIG. 4 is a partial cross-sectional view of a rechargeable battery according to a second exemplary embodiment.

FIG. 4 is a partial cross-sectional view of a rechargeable battery according to a second exemplary embodiment.

Referring to FIG. 4, a rechargeable battery 102 according to the present exemplary embodiment is the same as the rechargeable battery of the first exemplary embodiment in structure, excluding a lower insulation member 72 and a valve member 73, and therefore a repeated description will be omitted.

The lower insulation member 72 according to the present exemplary embodiment is disposed under the cap plate 31 while insulating a first terminal 21 and a current collecting tab 41 from a cap plate 31.

A lower hole 72a connected with a short-circuit 37 is provided in the lower insulation member 72, and the valve member 73 blocking the lower hole 72a is provided in a lower end of the lower hole 72a.

The valve member 73 controls connection between the short-circuit hole 37 and an internal space of a case 26, and therefore the short-circuit hole 37 is disconnected with the internal space of the case 26 by the valve member 73 and a pressure of the short-circuit hole 37 is not increased until the valve member 73 is broken even through an internal pressure of the case 26 is increased.

The valve member 73 is formed in the shape of a sheet attached to the lower end of the lower hole 72a, and a notch 73a extended along an edge direction of the lower hole 72a is formed in the valve member 73 so as to be opened at a predetermined pressure. An opening pressure of the valve member 73 can be easily set with the thickness and a material of the valve member 73 and the depth of the notch 73a.

As in the present exemplary embodiment, when the valve member 73 is formed in the shape of a sheet, the material and thickness of the valve member 73 can be easily set such that a pressure at which the valve member 73 is opened can be freely set.

Figure 5:
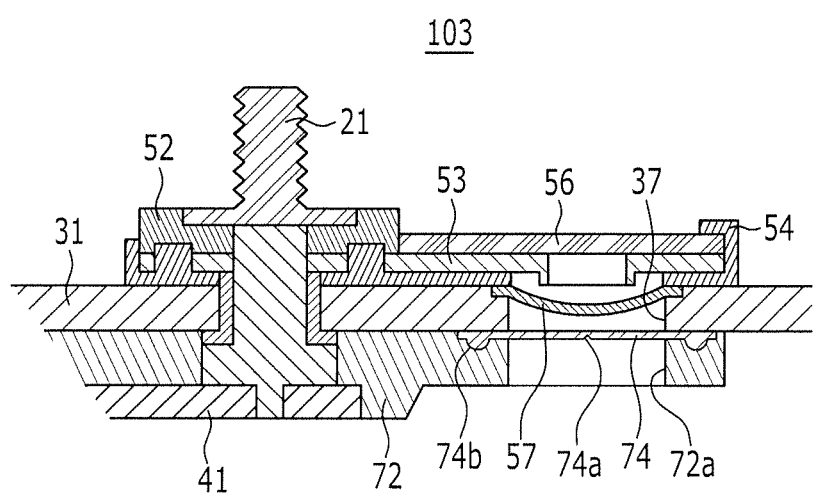
FIG. 5 is a partial cross-sectional view of a rechargeable battery according to a third exemplary embodiment.

FIG. 5 is a partial cross-sectional view of a rechargeable battery according to a third exemplary embodiment.

Referring to FIG. 5, a rechargeable battery 103 according to the present exemplary embodiment is the same as the rechargeable battery of the first exemplary embodiment in structure, excluding a lower insulation member 72 and a valve member 74, and therefore a repeated description will be omitted.

The lower insulation member 72 according to the present exemplary embodiment is disposed under a cap plate 31 while insulating a first terminal 21 and a current collecting tab 41 from the cap plate 31.

A lower hole 72a connected with a short-circuit 37 is provided in the lower insulation member 72, and the valve member 73 blocking the lower hole 72a is provided in an upper end of the lower hole 72a. The valve member 74 is formed in the shape of a sheet attached to the upper end of the lower hole 72a, and a notch 73a is formed in shape of a cross so as to be opened at a predetermined pressure. An opening pressure of the valve member 74 can be easily set with the thickness and a material of the valve member 73 and the depth of the notch 74a.

Since an edge of the valve member 74 is inserted between the lower insulation member 72 and the cap plate 31, a sealing protrusion 74b protruding toward the lower insulation member 72 between the lower insulation member 72 and the cap plate 31 is formed in the edge of the valve member 74. The sealing protrusion 74b extends along a circumference direction of the short-circuit hole 37. As in the present exemplary embodiment, gas leakage between the cap plate 31 and the lower insulation member 72 can be prevented by forming the sealing protrusion 74b in the edge of the valve member 74.

Figure 6:
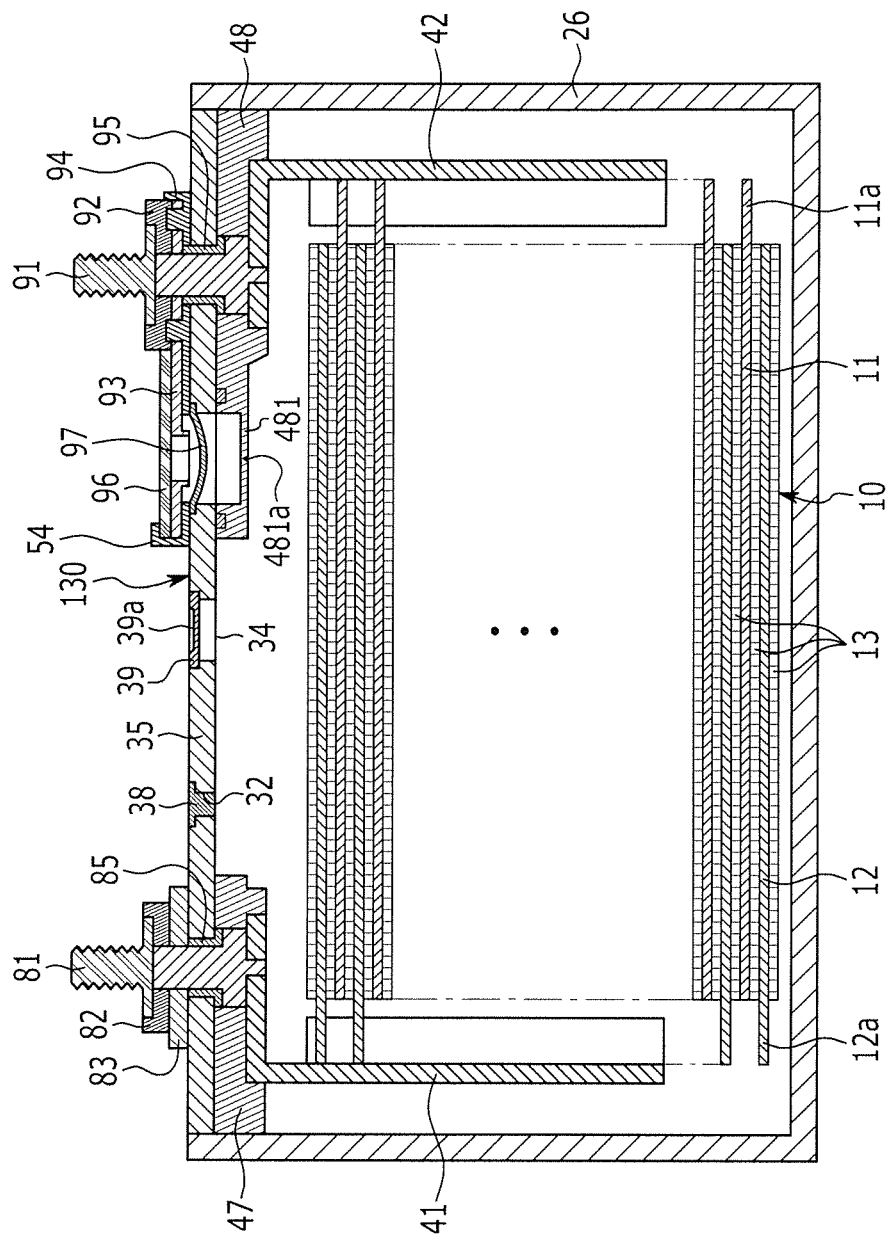
FIG. 6 is a cross-sectional view of a rechargeable battery according to a fourth exemplary embodiment.
Figure 1:
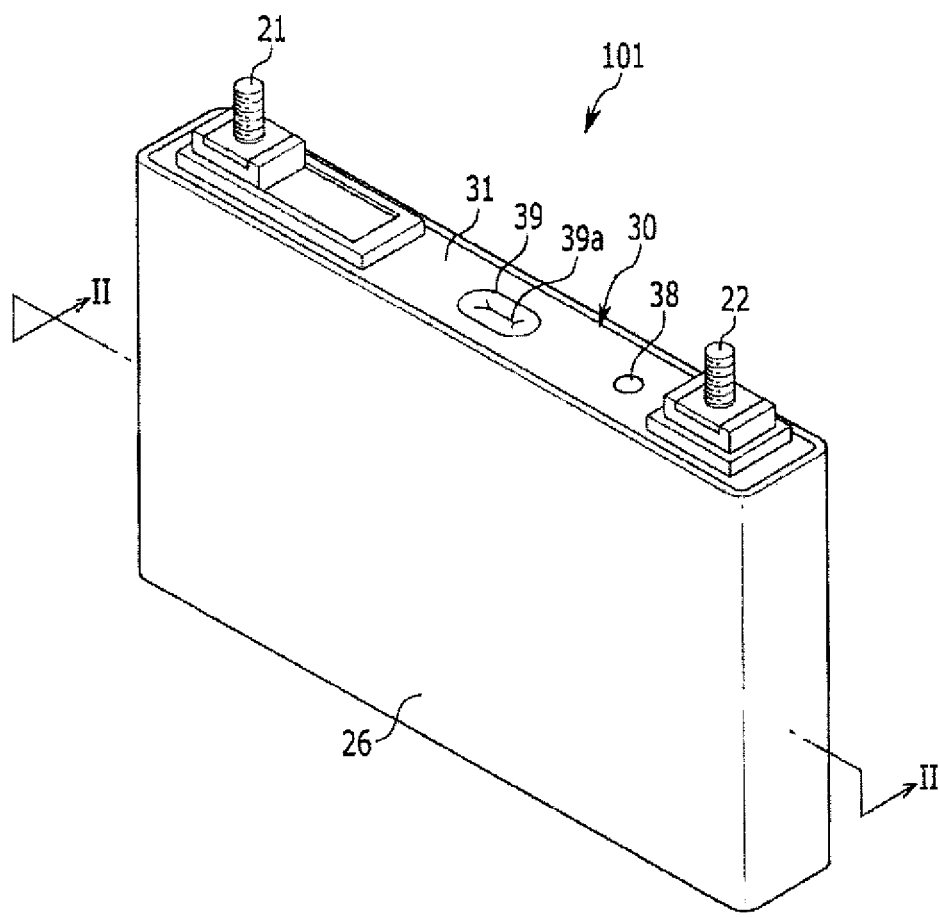
Figure 2:
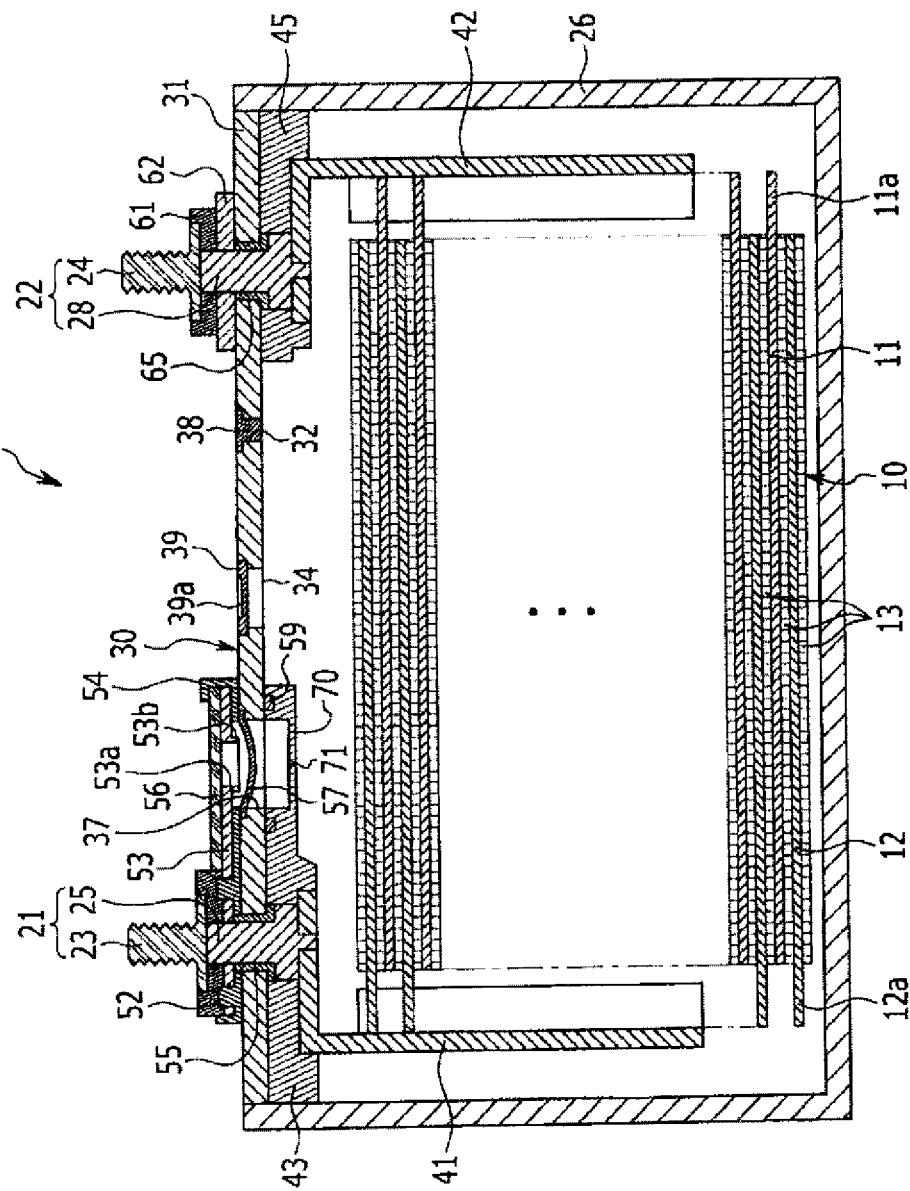
Figure 3:
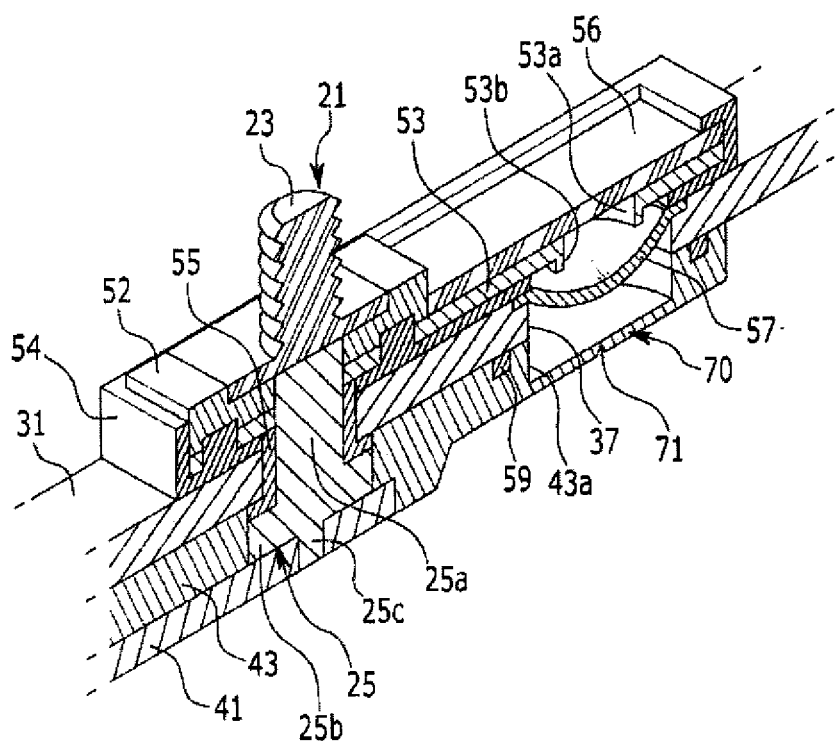
Figure 4:
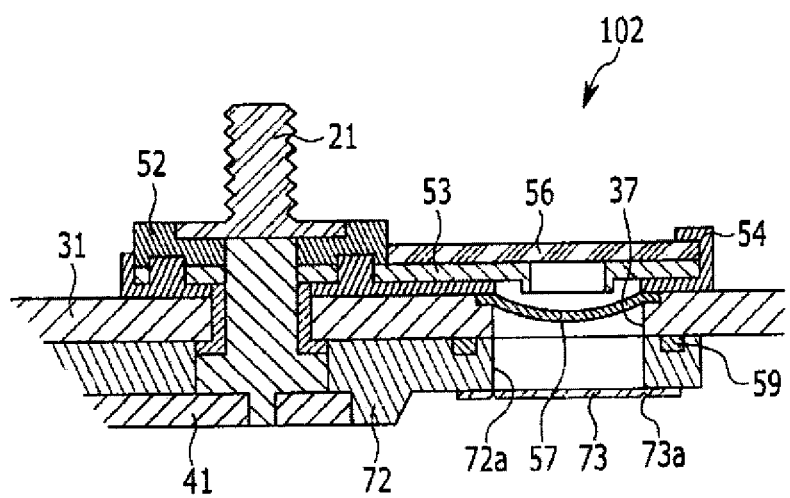
Figure 5:
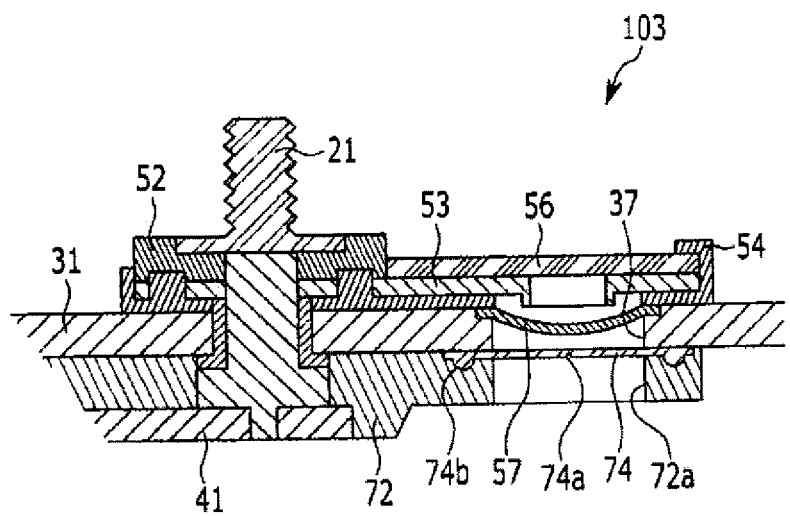
Figure 6:
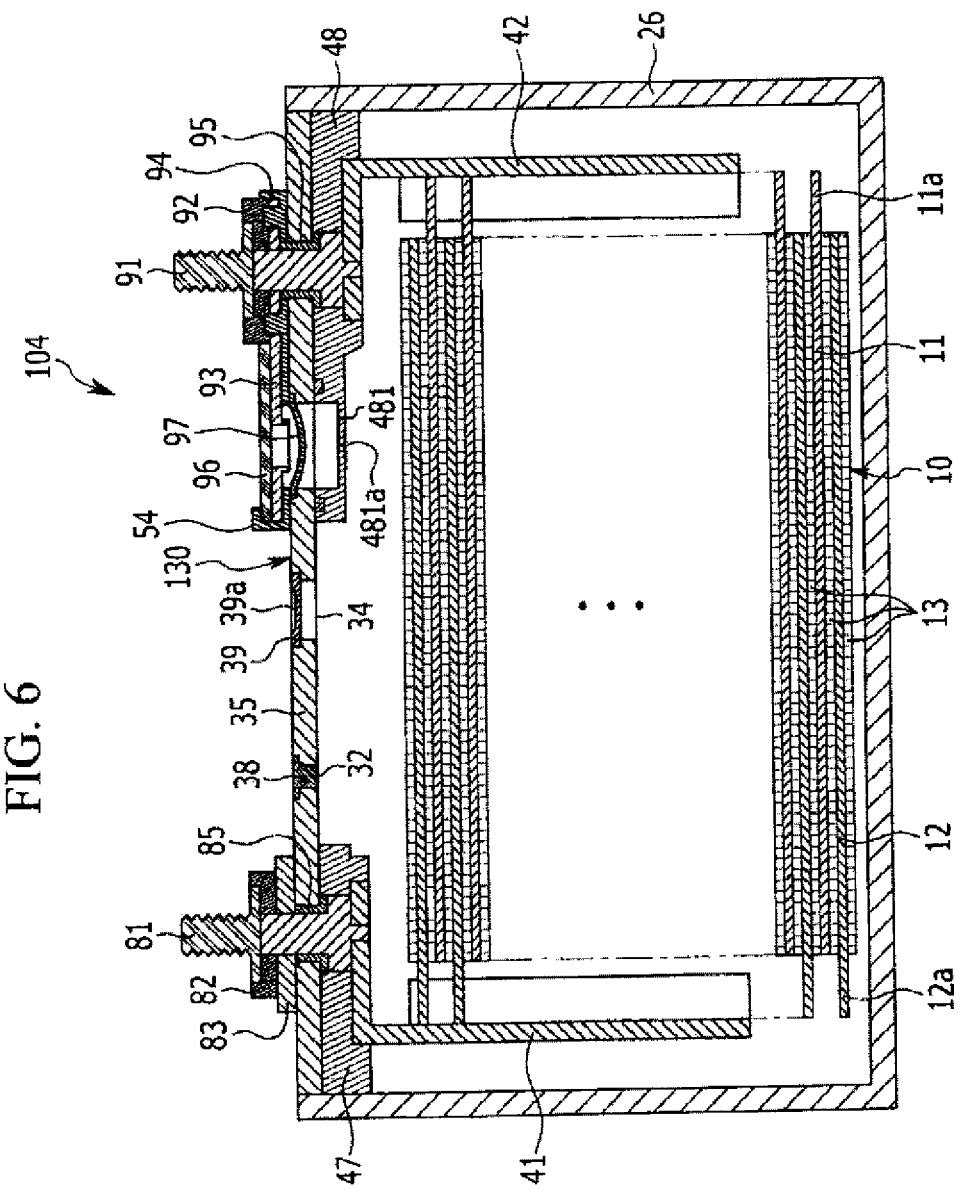

FIG. 6 is a cross-sectional view of a rechargeable battery according to a third exemplary embodiment.

Referring to FIG. 6, a rechargeable battery 104 according to the present exemplary embodiment is the same as the rechargeable battery of the first exemplary embodiment, excluding a cap assembly 130, and therefore a repeated description will be omitted.

The cap assembly 130 includes a cap plate 35 covering an opening of a case 26, a first electrode 81 protruding to the outside of the cap plate 35 and electrically connected with a negative electrode 12, and a second terminal 91 protruding to the outside of the cap plate 35 and electrically connected with a positive electrode 11.

The cap plate 35 is formed in the shape of a plate extended along one direction, and coupled to the opening of the case 26. The cap plate 35 includes a sealing cap 38 formed in an electrolyte injection opening 32 and a vent plate 39 having a notch 39 formed in a vent hole 34 so as to be opened at a predetermined pressure.

The first terminal 81 and the second terminal 91 protrude upward of the cap plate 35. The first terminal 81 is electrically connected to the negative electrode through a current collecting tab 41, and the second terminal 91 is electrically connected to the positive electrode 11 through a current collecting tab 42.

The first terminal 81 includes an externally exposed outer terminal and a connection terminal. The outer terminal and the connection terminal are the same as those of the first exemplary embodiment in structure, and a repeated description will be omitted.

A gasket 85 for sealing between the first terminal 81 and the cap plate 35 is inserted to a hole through which the first terminal 81 is penetrated, and a lower insulation member 47 is provided under the cap plate 35 for insulation of the first terminal 81 and the current collecting tab 41 from the cap plate 35.

A connection plate 83 is provided in the first terminal 81 to electrically connect the first terminal 81 with the cap plate 35. The first terminal 81 is fitted in the connection plate 83, and thus the connection plate 83 is electrically connected with the first terminal 81 through a connection tab 82 provided in an upper portion thereof.

The second terminal 91 is the same as the second terminal of the first exemplary embodiment in structure. A short-circuit tab 93 is electrically formed in the second terminal 91, and accordingly the short-circuit tab 93 is provided on the cap plate 35. An upper insulation member 94 is provided between the short-circuit tab 93 and the cap plate 35 to electrically insulate the short-circuit tab 93 and the cap plate 35. The short-circuit tab 93 is electrically connected with the second terminal 91 through a connection tab 92 provided in an upper portion thereof, and the connection tab 92 is welded to the second terminal 91.

The cap assembly 130 includes a short-circuit member 97 that short-circuits the positive electrode 11 and the negative electrode 12, and thus the short-circuit member 97 is electrically connected to the cap plate 35 that is electrically connected with the negative electrode 12 and the short-circuit member 97 is electrically connected with the short-circuit tab 93 electrically connected with the positive electrode 11 by being deformed when an internal pressure of the rechargeable battery 104 is increased.

A short-circuit hole is formed in the cap plate 35, and the short-circuit member 97 is disposed between an insulation member 94 and the cap plate 35 in a short-circuit hole. The short-circuit member 97 may be formed of an arc-shaped portion convex downward and an inverse plate having an edge fixed to the cap plate 35.

A lower hole connected with the short-circuit hole is formed in a lower insulation member 48 and a valve member 481 that blocks the lower hole is formed in the lower hole. The valve member 481 controls connection between the short-circuit hole and an internal space of the case 26.

The valve member 481 is integrally formed with the lower insulation member 48, and a notch 481 is formed therein so as to be easily opened at a predetermined pressure.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 101, 102, 103, 104: rechargeable battery | 10: electrode assembly |
| 11: positive electrode | 11a: positive electrode uncoated region |
| 12: negative electrode | 12a: negative uncoated region |

<Description of symbols>

13: separator
22, 91: second terminal
25, 28: connection terminal
25b: lower flange
26: case
31, 35: cap plate
34: vent hole
38: sealing cap
39a, 481a, 71, 73a, 74a: notch
43, 45, 47, 48, 72: lower insulation member
481, 70, 73, 74: valve member
53, 93: short-circuit tab
53b: reinforcing protrusion
55, 62, 85: gasket
59: sealing member
70: valve member
21, 81: first terminal
23, 24: outer terminal
25a: column portion
25c: lower protrusion
30, 130: cap assembly
32: electrolyte injection opening
37: short-circuit hole
39: vent plate
41, 42: current collecting tab
43a, 72a: lower hole
52, 61, 82, 92: connection tab
53a: upper hole
54, 94: upper insulation member
57, 97: short-circuit member
62, 83: connection plate
74b: sealing protrusion

What is claimed is:

1. A rechargeable battery comprising:
an electrode assembly comprising a positive electrode and a negative electrode;
a case having a cavity housing the electrode assembly;
a cap plate having a short-circuit hole, the cap plate being coupled to the case;
a short-circuit member in the short-circuit hole and configured to be deformed to electrically connect the positive electrode to the negative electrode; and
a valve member between the short-circuit member and the electrode assembly.

2. The rechargeable battery of claim 1, wherein the valve member has a first portion having a first thickness and a second portion having a second thickness, the second thickness being greater than the first thickness.

3. The rechargeable battery of claim 2, wherein the first portion is located at a central portion of the valve member.

4. The rechargeable battery of claim 2, wherein the first portion is located at a peripheral portion of the valve member.

5. The rechargeable battery of claim 1, wherein the valve member has a notch.

6. The rechargeable battery of claim 1, wherein the valve member is configured to control a pressure connection between the short-circuit hole and an internal space of the cavity and wherein the valve member is configured to close the pressure connection when a cavity pressure of the cavity is below an opening pressure and to open the pressure connection when the cavity pressure exceeds the opening pressure.

7. The rechargeable battery of claim 6, wherein the opening pressure is greater than a deformation pressure at which the short-circuit member is deformed to electrically connect the positive electrode to the negative electrode.

8. The rechargeable battery of claim 7, wherein the opening pressure is 1.05 to 1.50 times the deformation pressure.

9. The rechargeable battery of claim 7, wherein a portion of the short circuit member is configured to protrude toward the electrode assembly when a pressure in the short-circuit hole is below the deformation pressure and to protrude away from the electrode assembly when the pressure in the short-circuit hole is greater than the deformation pressure.

10. The rechargeable battery of claim 1, further comprising:
a terminal electrically connected to the electrode assembly, penetrating the cap plate, and protruding outside the case; and
a lower insulation member electrically insulating the terminal from the cap plate and located at a side of the cap plate facing the electrode assembly, the lower insulation member having a lower hole overlapping with the short circuit hole,
wherein the valve member seals the lower hole.

11. The rechargeable battery of claim 10, wherein the valve member is integrally formed with the lower insulation member.

12. The rechargeable battery of claim 10, wherein the valve member is formed of a film and is fixed to a side of the lower insulation member facing the electrode assembly.

13. The rechargeable battery of claim 10, further comprising a sealing member between the cap plate and the lower insulation member and encircling the short circuit hole.

14. The rechargeable battery of claim 10, wherein the valve member is formed of a film and is between the lower insulation member and the cap plate, the valve member having a sealing protrusion, the sealing protrusion encircling the short circuit hole.

15. The rechargeable battery of claim 1, further comprising a short-circuit tab adapted to contact the short-circuit member when the short-circuit member is deformed.

16. The rechargeable battery of claim 15, wherein the short circuit tab has a short-circuit protrusion protruding toward the short-circuit member.

17. The rechargeable battery of claim 16, wherein a portion of the short circuit tab has a hole overlapping the short-circuit hole and wherein the short-circuit protrusion is formed along a circumference of the hole of the short circuit tab.

18. The rechargeable battery of claim 15, wherein the cap plate, the short-circuit tab, and the short-circuit member are electrically connected to both the positive electrode and the negative electrode when the short-circuit member is deformed and contacts the short-circuit tab.

19. The rechargeable battery of claim 15, wherein the short-circuit tab is electrically connected to the negative electrode.

20. The rechargeable battery of claim 1, wherein the cap plate is electrically connected to the positive electrode.

* * * * *

UNITED STATES PATENT AND TRADEMARK OFFICE
CERTIFICATE OF CORRECTION

PATENT NO. : 8,642,196 B2
APPLICATION NO. : 13/210124
DATED : February 4, 2014
INVENTOR(S) : Guen Page 1 of 16

It is certified that error appears in the above-identified patent and that said Letters Patent is hereby corrected as shown below:

> Please delete patent 8642196 in its entirety and insert patent 8642196 in its entirety as shown on the attached pages.

Signed and Sealed this
Sixteenth Day of June, 2015

Michelle K. Lee
*Director of the United States Patent and Trademark Office*

(12) United States Patent
Guen

(10) Patent No.: US 8,642,196 B2
(45) Date of Patent: Feb. 4, 2014

(54) RECHARGEABLE BATTERY

(75) Inventor: Min-Hyung Guen, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 276 days.

(21) Appl. No.: 13/210,124

(22) Filed: Aug. 15, 2011

(65) Prior Publication Data
US 2012/0315515 A1 Dec. 13, 2012

Related U.S. Application Data

(60) Provisional application No. 61/494,743, filed on Jun. 8, 2011.

(51) Int. Cl.
*H01M 2/12* (2006.01)
(52) U.S. Cl.
USPC .................... 429/56; 429/53; 429/59
(58) Field of Classification Search
USPC .............................. 429/53, 56, 59
See application file for complete search history.

(56) References Cited

U.S. PATENT DOCUMENTS

| | | | |
|---|---|---|---|
| 6,403,250 B1 * | 6/2002 | Azema et al. | 429/53 |
| 2007/0269711 A1 * | 11/2007 | Meguro et al. | 429/94 |
| 2010/0167107 A1 * | 7/2010 | Byun et al. | 429/56 |
| 2010/0279156 A1 | 11/2010 | Kim et al. | |
| 2011/0039136 A1 * | 2/2011 | Byun et al. | 429/56 |

FOREIGN PATENT DOCUMENTS

| | | |
|---|---|---|
| EP | 2 284 932 A1 | 2/2011 |
| EP | 2 299 512 A1 | 3/2011 |
| JP | 11-40203 | 2/1999 |
| JP | 2000-082457 | 3/2000 |
| KR | 10-2011-0005197 A | 1/2011 |

OTHER PUBLICATIONS

Patent Abstracts of Japan, with Machine English translation of entire patent, for JP 2000-082457; Published Mar. 21, 2000; in the name of Fujii et al., 13 pages.
European Search Report dated Sep. 21, 2012 for European Patent Application No. 11178263.7, 7 pages.

* cited by examiner

*Primary Examiner* — Basia Ridley
*Assistant Examiner* — James Erwin
(74) *Attorney, Agent, or Firm* — Christie, Parker & Hale, LLP

(57) ABSTRACT

A rechargeable battery includes an electrode assembly including a positive electrode and a negative electrode, a case having a cavity housing the electrode assembly, a cap plate having a short-circuit hole, the cap plate being coupled to the case, a short-circuit member in the short-circuit hole and configured to be deformed to electrically connect the positive electrode to the negative electrode; and a valve member between the short-circuit member and the electrode assembly.

20 Claims, 8 Drawing Sheets

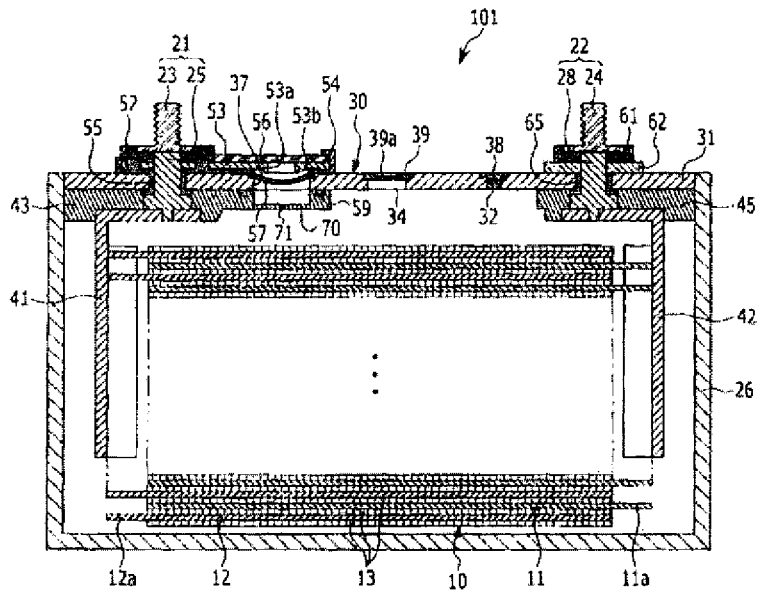

RECHARGEABLE BATTERY

CROSS-REFERENCE TO RELATED APPLICATIONS

This application claims priority to and the benefit of U.S. Provisional Application No. 61/494,743, filed on June 8, 2011, in the United States Patent and Trademark Office, the disclosure of which is incorporated herein in its entirety by reference.

BACKGROUND

1. Field

Embodiments of the present invention generally relate to a rechargeable battery.

2. Description of the Related Art

A rechargeable battery differs from a primary battery in that it can be repeatedly charged and discharged, while the latter undergoes only an irreversible conversion of chemical to electrical energy. A low-capacity rechargeable battery is often used as the power supply for small electronic devices, such as cellular phones, notebook computers and camcorders, while a high-capacity rechargeable battery is often used as the power supply for driving motors in hybrid vehicles and the like.

Recently, a high power rechargeable battery that includes a non-aqueous electrolyte having a high energy density has been developed and is constituted by a large capacity rechargeable battery in which a plurality of rechargeable batteries (or rechargeable cells) are coupled in series in order to use it to drive devices requiring a large amount of power, for example, motors such as for electric vehicles. For example, the rechargeable battery is coupled to a motor for propelling an electric vehicle or a hybrid electric vehicle.

In addition, a large capacity rechargeable battery generally includes a plurality of rechargeable batteries (or rechargeable cells) that are coupled in series, and the rechargeable battery may be formed of cylindrical and angular shapes.

If overcurrent flows through the rechargeable battery having a case that is made of a material such as metal, the temperature of the rechargeable battery increases so that the rechargeable battery may explode or ignite.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention are directed toward a rechargeable battery having improved safety.

A rechargeable battery according to one embodiment of the present invention includes: an electrode assembly comprising a positive electrode and a negative electrode; a case having a cavity housing the electrode assembly; a cap plate having a short-circuit hole, the cap plate being coupled to the case; a short-circuit member in the short-circuit hole and configured to be deformed to electrically connect the positive electrode to the negative electrode; and a valve member between the short-circuit member and the electrode assembly.

The valve member may have a first portion having a first thickness and a second portion having a second thickness, the second thickness being greater than the first thickness.

The first portion may be located at a central portion of the valve member.

The first portion may be located at a peripheral portion of the valve member.

The valve member may have a notch.

The valve member may be configured to control a pressure connection between the short-circuit hole and an internal space of the cavity and the valve member may be configured to close the pressure connection when a cavity pressure of the cavity is below an opening pressure and to open the pressure connection when the cavity pressure exceeds the opening pressure.

The opening pressure may be greater than a deformation pressure at which the short-circuit member is deformed to electrically connect the positive electrode to the negative electrode.

The opening pressure may be 1.05 to 1.50 times the deformation pressure.

A portion of the short circuit member may be configured to protrude toward the electrode assembly when a pressure in the short-circuit hole is below the deformation pressure and to protrude away from the electrode assembly when the pressure in the short-circuit hole is greater than the deformation pressure.

The rechargeable battery may further include: a terminal electrically connected to the electrode assembly, penetrating the cap plate, and protruding outside the case; and a lower insulation member electrically insulating the terminal from the cap plate and located at a side of the cap plate facing the electrode assembly, the lower insulation member having a lower hole overlapping with the short circuit hole, wherein the valve member seals the lower hole.

The valve member is integrally formed with the lower insulation member.

The valve member may be formed of a film and may be fixed to a side of the lower insulation member facing the electrode assembly.

The rechargeable battery may further include a sealing member between the cap plate and the lower insulation member and encircling the short circuit hole.

The valve member may be formed of a film and may be between the lower insulation member and the cap plate, the valve member having a sealing protrusion, the sealing protrusion encircling the short circuit hole.

The rechargeable battery may further include a short-circuit tab adapted to contact the short-circuit member when the short-circuit member is deformed.

The short circuit tab may have a short-circuit protrusion protruding toward the short-circuit member.

A portion of the short circuit tab may have a hole overlapping the short-circuit hole and the short-circuit protrusion may be formed along a circumference of the hole of the short circuit tab.

The cap plate, the short-circuit tab, and the short-circuit member may be electrically connected to both the positive electrode and the negative electrode when the short-circuit member is deformed and contacts the short-circuit tab.

The short-circuit tab may be electrically connected to the negative electrode.

The cap plate may be electrically connected to the positive electrode.

Accordingly to embodiments of the present invention, the valve member can maintain a fuse member to be in a short-circuit state when a short-circuit occurs due to an overcurrent so that safety of the rechargeable battery can be improved. As such, an electric vehicle or a hybrid electric vehicle including the rechargeable battery, for example, can be made safer.

BRIEF DESCRIPTION OF THE DRAWINGS

FIG. 1 is a perspective view of a rechargeable battery according to a first exemplary embodiment.

FIG. 2 is a cross-sectional view of FIG. 1, taken along the line II-II of FIG. 1.

FIG. 3 is a partial cut-away perspective view of a rechargeable battery according to the first exemplary embodiment.

FIG. 4 is a partial cross-sectional view of a rechargeable battery according to a second exemplary embodiment.

FIG. 5 is a partial cross-sectional view of a rechargeable battery according to a third exemplary embodiment.

FIG. 6 is a cross-sectional view of a rechargeable battery according to a fourth exemplary embodiment.

Figure 7:
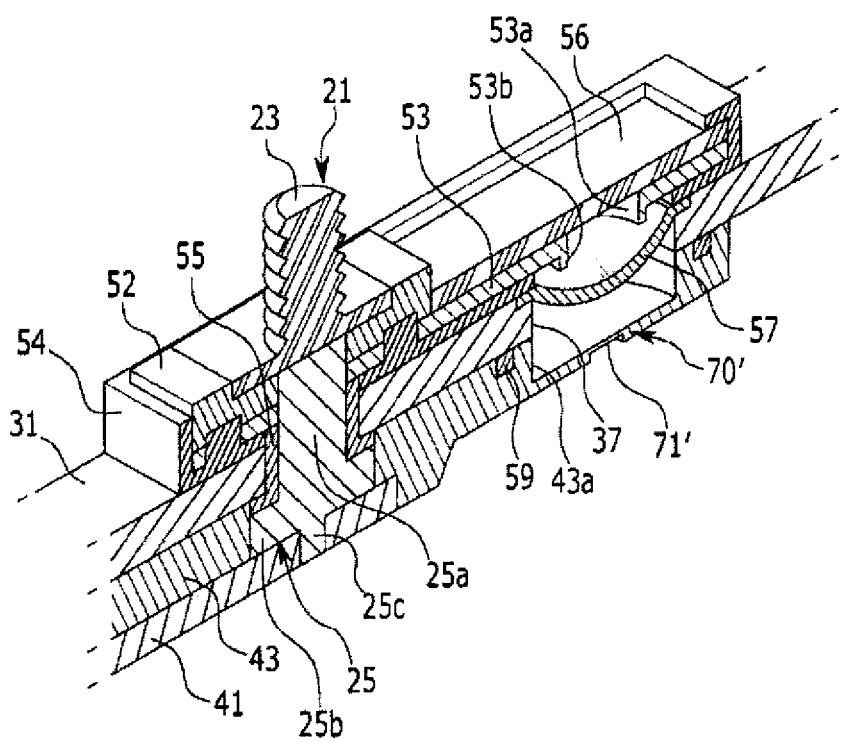

FIG. 7 is a partial cut-away perspective view of a rechargeable battery according to a fifth exemplary embodiment.

Figure 8:
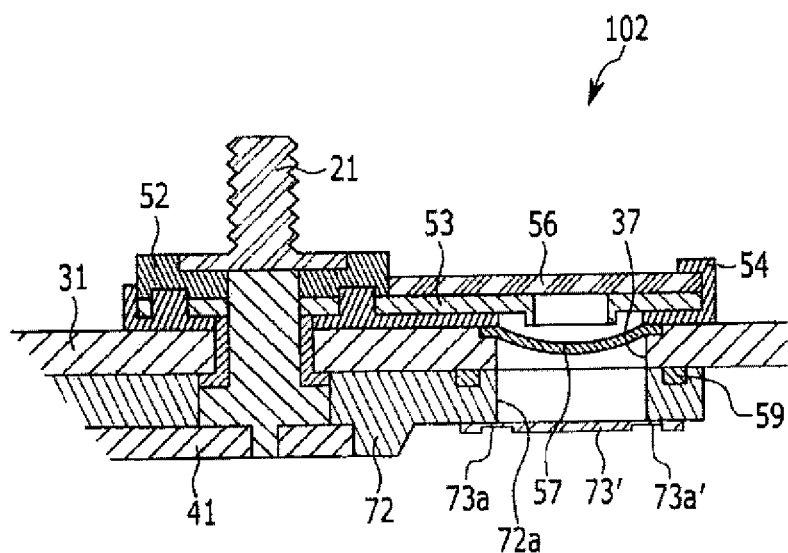

FIG. 8 is a partial cross-sectional view of a rechargeable battery according to a sixth exemplary embodiment.

DETAILED DESCRIPTION

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings and description, like reference numerals designate like elements throughout the specification.

FIG. 1 is a perspective view of a rechargeable battery according to a first exemplary embodiment and FIG. 2 is a cross-sectional view of the embodiment of FIG. 1, taken along the line II-II.

Referring to FIG. 1 and FIG. 2, a rechargeable battery 101 according to the first exemplary embodiment includes an electrode assembly 10 that is formed by interposing a separator 13 between a positive electrode 11 and a negative electrode 12 and winding the separator 13, positive electrode 11, and negative electrode 12 together, a case 26 in which the electrode assembly 10 is installed, and a cap assembly 30 coupled to an opening of the case 26.

The rechargeable battery 101 according to the first exemplary embodiment is illustrated as a square-shaped lithium ion rechargeable battery. However, embodiments of the present invention are not limited thereto, and can be applied to variously shaped batteries such as a lithium polymer battery or a cylindrical battery.

The positive electrode 11 and the negative electrode 12 include a coated region where an active material is coated on a current collector formed of a thin metal foil and uncoated regions 11a and 12a which are not coated with the active material. The positive electrode uncoated region 11a is formed at one side end of the positive electrode 11 along a length direction thereof, and the negative uncoated region 12a is formed at the other (e.g., opposite) side end of the negative electrode along a length direction thereof negative electrode 12. The positive electrode 11 and the negative electrode 12 are spirally-wound with the separator 13, which is an insulator, interposed therebetween.

However, embodiments of the present invention are not limited thereto, and the electrode assembly 10 may have a structure where a positive electrode and a negative electrode, respectively (e.g., each) formed of a plurality of sheets, are layered, with a plurality of separators interposed therebetween.

The case 26 is substantially formed in the shape of a cuboid, and an opening is formed in one side thereof. The case 26 may be formed of a metal such as aluminum, stainless steel, and the like.

The cap assembly 30 includes a cap plate 31 covering the opening of the case 26, a first terminal 21 protruding to the outside of the cap plate 31 and electrically connected to the positive electrode 11, and a second terminal 22 protruding to the outside of the cap plate 31 and electrically connected to the negative electrode 12.

The cap plate 31 is formed in the shape of a plate extending in one direction and is coupled to the opening of the case 26. The cap plate 31 includes a sealing cap 38 provided in an electrolyte injection opening 32 and a vent plate 39 having a notch 39a configured to be opened at a pressure (e.g., a predetermined pressure). The notch 39a is located in the vent hole 34.

The first terminal 21 and the second terminal 22 protrude upward from the cap plate 31.

The first terminal 21 is electrically connected to the negative electrode 12 through a current collecting tab 41, and the second terminal 22 is electrically connected to the positive electrode 11 through the current collecting tab 41. However, embodiments of the present invention are not limited thereto. For example, first terminal 21 may be electrically connected to the positive electrode, and the second terminal 22 may be electrically connected to the negative electrode.

As shown in FIG. 3, in one embodiment of the present invention, the first terminal 21 includes an externally exposed outer terminal 23 and a connection terminal 25 disposed under the outer terminal 23 and joined to the current collecting tab 41. The outer terminal 23 is formed in the shape of a circular cylinder having a screw thread 15 formed on an external circumference thereof. The connection terminal 25 includes a column portion 25a, a lower flange 25b, and a lower protrusion 25c. The column portion 25a penetrates the cap plate 31, and an upper end thereof contacts the outer terminal 23 and is fixed thereto, the lower flange 25b protrudes outwardly away from a lower end of the column portion 25a, and the lower protrusion 25c protrudes downward from the lower 20 end of the column portion 25a, is inserted into the current collecting tab 41, and is fixed thereto by welding. A gasket 55 provided between the connection terminal 25 of the first terminal 21 and the cap plate 31 for sealing is inserted into a hole through which the terminal is penetrated, and a lower insulation member 43 is provided under the cap plate 31 for insulation (e.g., electrical insulation) of the connection terminal 25 of the first terminal 21 and the current collecting tab 41 from the cap plate 31.

Also, a short-circuit tab 53 electrically connected to the first terminal 21 is formed on the cap plate 31. An upper insulation member 54 is provided between the short-circuit tab 53 and the cap plate 31 for electrical insulation therebetween. Because the short-circuit tab 53 is electrically connected to the first terminal 21 through a connection tab 52 and the connection tab 52 is disposed under the outer terminal 23, a groove to which a flange formed in the outer terminal 23 is inserted is formed in the connection tab 52 and welded to the outer terminal 23. In add Won, the connection terminal 25 is inserted to a lower portion of the connection tab 52, and the outer terminal 23 is inserted to an upper portion of the connection tab 52.

Referring to FIG. 2, the second terminal 22 includes an externally exposed outer terminal 24 and a connection terminal 28. The outer terminal 24 is formed in the shape of a circular cylinder having a screw thread formed on an external circumference thereof. The connection terminal 28 is welded to a current collecting tab 42 and penetrates the cap plate 31 such that an upper portion of the connection terminal 28 contacts the outer terminal 24 and is fixed thereto. A gasket 65 formed between the connection terminal 28 of the second terminal 22 and the cap plate 31 for sealing is 15 inserted into a hole through which the second terminal 22 is penetrated, and a lower insulation member 45 is provided under the cap plate 31 for insulation (e.g., electrical insulation) of the connection terminal 28 of the second terminal 22 and the current collecting tab 42 from the cap plate 31.

A connection plate 62 that electrically connects the second terminal 22 and the cap plate 31 is provided at the second terminal 22. Since the second terminal 22 is inserted into the connection plate 62, the connection plate 62 is electrically connected with the second terminal 22 through a connection tab 61 provided in an upper portion of the connection plate 62. The connection tab 61 is provided under the outer terminal 24 and welded thereto. In addition, the connection terminal 28 is inserted to a lower portion of the connection tab 61, and the outer terminal 24 is inserted into an upper portion of the connection terminal 28. With such a structure, the cap plate 31 can be electrically connected with the second terminal 22.

As shown in FIG. 3, the cap assembly 30 includes a short-circuit member 57 that short-circuits the positive electrode 11 and the negative electrode 12. The short-circuit member 57 is electrically connected with the cap plate 31 that is electrically connected to the positive electrode 11, and the short-circuit member 57 is deformed when an internal pressure of the rechargeable battery 101 is increased beyond a deformation pressure and thus contacts the short-circuit tab 53 that is electrically connected to the negative electrode 12 to form an electrical connection.

A short-circuit hole 37 is formed in the cap plate 31, and the short-circuit member 57 is disposed in the short-circuit hole 37 between the upper insulation member 54 and the cap plate 31. The short-circuit member 57 may be formed of an arc-shaped convex downward portion and a plate portion having an edge fixed to the cap plate 31.

An upper hole 53a connected with the short-circuit hole 37 is formed in the short-circuit tab 53, and a reinforcing protrusion 53b protruding downward is formed along a circumference of the upper hole 53a. When the short-circuit tab 53 and the short-circuit member 57 contact each other, the reinforcing protrusion 53b contacts the short-circuit member 57. Thus, when an excessive current flows through the short-circuit tab 53, interruption of the short-circuit state due to melting of the short-circuit tab 53 can be reduced or prevented because the reinforcing protrusion 53b having a large thickness contacts the short-circuit member 57.

A lower hole 43a connected with the short-circuit hole 37 is formed in a lower insulation member 43, and a valve member 70 that blocks the lower hole 43a is provided in the lower hole 43a.

The valve member 70 is set to be opened at a pressure (e.g., an opening pressure or a predetermined pressure), and therefore the valve member 70 is opened when the internal pressure of the rechargeable battery 101 is higher than the opening pressure. The valve member 70 controls a pressure connection between the short-circuit hole 37 and an inner space of the case 26 and the short-circuit hole 37 is separated from the inner space of the case 26 by the valve member 70. Accordingly even if the internal pressure of the case 26 is increased, a pressure (e.g., air pressure) in the short-circuit hole 37 is not increased until the valve member 70 is broken.

The valve member 70 is disposed in a lower end of the lower hole 43a (e.g., an end near the ectrode assembly), and formed in the shape of a plate that is integrally formed with the lower insulation member 43. Further, a notch 71 is formed to facilitate opening at the opening pressure and to control the opening pressure.

In the first exemplary embodiment, when the valve member 70 is integrally formed with the lower insulation member 43, the valve member 70 can be formed during a process of forming the lower insulation member 43 such that a separate process for forming the valve member 70 can be omitted and the valve member 70 and the lower insulation member 43 can be concurrently (or simultaneously) formed through insert or injection molding. Further, because the valve member 70 is formed in the shape of a plate where the notch 71 is formed, variation of operation pressure due to variation of elasticity can be reduced or prevented.

An elastic member such as a spring may lose elasticity as time passes which may cause operational problems in maintaining a stable opening pressure, but the valve member 70 according to embodiments of the present invention does not receive pressure at ordinary times (e.g., under normal operating conditions) and thus the valve member 70 is operable (e.g., will open) at the opening pressure even after considerable time has passed.

An opening pressure of the valve member 70 may be set to be higher than a deformation pressure of the short-circuit member 57. In particular, the opening pressure of the valve member 70 may be 1.05 to 1.5 times of that of the deformation pressure of the short-circuit member 57. That is, when the deformation pressure of the short-circuit member 57 is 4.5kgf, the opening pressure of the valve member 70 may be between 4.725kgf to 6.75kgf.

When a downwardly protruding portion of the short-circuit member 57 is inverted such that the portion protrudes upward, the short-circuit member 57 is electrically connected with the short-circuit tab 53, and thus the deformation pressure may be difficult to control so that an operation pressure (e.g., a pressure at which the electrical connection between the short-circuit member 57 and the short-circuit tab 53) cannot be easily set because the deformation pressure may be changed depending on the shape, thickness, after-process, assembling, and management. Therefore, when the operation pressure is changed and thus it is deviated from the dispersion range during an assembling process, the short-circuit member 57 may not operate even though the internal pressure of the rechargeable battery 101 is increased. However, according to one embodiment, the short-circuit member 57 may be deformed when the valve member 70 is opened by providing the valve member 70 with an opening pressure higher than a deformation pressure of the short-circuit member 57. Accordingly, the opening pressure of the valve member 70 may be the deformation pressure of the short-circuit member 57. Since the shape of the valve member 70 is not restricted, an opening pressure may set to be constant. That is, when the deformation pressure of the short-circuit member 57 is set to be lower than a breakage pressure that causes substantial deformation (or breakage) of the short-circuit member 57 and the opening pressure of the valve member 70 is set to be the breakage pressure, a pressure at which the short-circuit occurs can be precisely set.

A sealing member 59 is provided between the lower insulation member 43 and the cap plate 31. The sealing member 59 has a ring shape formed along an edge (e.g., a circumference) of the short-circuit hole 37. The sealing member 59 may be formed of a metal or an elastic material. When a gas is leaked between the lower insulation member 43 and the cap plate 31, the internal pressure of the case 26 cannot be transmitted to the short-circuit member 57 and thus the short-circuit member 57 may be inoperable at a pressure (e.g., a predetermined pressure). However, according to one embodiment, the leakage of the gas can be mitigated or prevented by providing the sealing member 59, and accordingly the short-circuit member 57 can be stably operated at the pressure (e.g., the predetermined pressure).

As described, according to one embodiment, when a temperature is increased or an electrolyte solution is dissolved and thus the internal pressure of the rechargeable battery 101 is excessively increased, current charged in the rechargeable battery 101 is discharged by a short-circuit caused by the short-circuit member 57 to thereby reduce the risk of or prevent explosion or ignition of the rechargeable battery 101. As such, for example, an electric vehicle or a hybrid electric vehicle can be made safer by including the rechargeable battery 101 according to an embodiment of the present invention can be made safer.

In particular, a space where the short-circuit member 57 contacts the short-circuit tab 53 is separated from a space where the electrolyte solution is provided, and therefore the risk of ignition of the electrolyte solution due to flame or heat generated from the short-circuit can be stably reduced or prevented.

FIG. 4 is a partial cross-sectional view of a rechargeable battery according to a second exemplary embodiment.

Referring to FIG. 4, a rechargeable battery 102 according to the second exemplary embodiment is the same as the rechargeable battery of the first exemplary embodiment in structure, excluding a lower insulation member 72 and a valve member 73, and therefore a repeated description will be omitted.

The lower insulation member 72 according to the present exemplary embodiment is disposed under the cap plate 31 while insulating a first terminal 21 and a current collecting tab 41 from a cap plate 31.

A lower hole 72a connected with a short-circuit 37 is provided in the lower insulation member 72, and the valve member 73 blocking the lower hole 72a is provided in a lower end of the lower hole 72a.

The valve member 73 controls a pressure connection between the short-circuit hole 37 and an internal space of a case 26, and therefore the short-circuit hole 37 is disconnected from the internal space of the case 26 by the valve member 73 and a pressure of the short-circuit hole 37 is not increased until the valve member 73 is broken (or opened) even through an internal pressure of the case 26 is increased.

The valve member 73 is formed in the shape of a sheet attached to the lower end of the lower hole 72a, and a notch 73a extends along an edge direction (e.g., a circumference) of the lower hole 72a is formed in the valve member 73 so as to be opened at a pressure (e.g., a predetermined pressure or an opening pressure). An opening pressure of the valve member 73 can be suitably set by selecting the thickness and a material of the valve member 73 and the depth of the notch 73a.

In the second exemplary embodiment, when the valve member 73 is formed in the shape of a sheet, the material and thickness of the valve member 73 can be suitably set such that a pressure at which the valve member 73 is opened can be suitably set.

FIG. 5 is a partial cross-sectional view of a rechargeable battery according to a third exemplary embodiment.

Referring to FIG. 5, a rechargeable battery 103 according to the third exemplary embodiment is substantially the same as the rechargeable battery of the first exemplary embodiment in structure, excluding a lower insulation member 72 and a valve member 74, and therefore a repeated description will not be provided.

The lower insulation member 72 according to the third exemplary embodiment is disposed under a cap plate 31 while electrically insulating a first terminal 21 and a current collecting tab 41 from the cap plate 31.

A lower hole 72a connected with a short-circuit hole 37 is provided in the lower insulation member 72, and the valve member 74 blocking the lower hole 72a is provided in an upper end of the lower hole 72a. The valve member 74 is formed in the shape of a sheet attached to the upper end of the lower hole 72a, and a notch 74a is formed in shape of a cross so as to be opened at a pressure (e.g., a predetermined pressure or an opening pressure). An opening pressure of the valve member 74 can be suitably set with the thickness and a material of the valve member 74 and the depth of the notch 74a.

Since an edge of the valve member 74 is inserted between the lower insulation member 72 and the cap plate 31, a sealing protrusion 74b protruding toward the lower insulation member 72 between the lower insulation member 72 and the cap plate 31 is formed along the edge of the valve member 74. The sealing protrusion 74b extends along a circumference of the short-circuit hole 37. As in the present exemplary embodiment, gas leakage between the cap plate 31 and the lower insulation member 72 can be reduced or prevented by forming the sealing protrusion 74b in the edge of the valve member 74.

FIG. 6 is a cross-sectional view of a rechargeable battery according to a fourth exemplary embodiment.

Referring to FIG. 6, a rechargeable battery 104 according to the fourth exemplary embodiment is the same as the rechargeable battery of the first exemplary embodiment, excluding a cap assembly 130, and therefore a repeated description will not be provided.

The cap assembly 130 includes a cap plate 35 covering an opening of a case 26, a first electrode 81 protruding to the outside of the cap plate 35 and electrically connected with a negative electrode 12, and a second terminal 91 protruding to the outside of the cap plate 35 and electrically connected with a positive electrode 11.

The cap plate 35 is formed in the shape of a plate extending along one direction and coupled to the opening of the case 26. The cap plate 35 includes a sealing cap 38 formed in an electrolyte injection opening 32 and a vent plate 39 having a notch 39a formed in a vent hole 34 so as to be opened at a pressure (e.g., a predetermined pressure).

The first terminal 81 and the second terminal 91 protrude upward from the cap plate 35. The first terminal 81 is electrically connected to the negative electrode 12 through a current collecting tab 41, and the second terminal 91 is electrically connected to the positive electrode 11 through a current collecting tab 42.

The first terminal 81 includes an externally exposed outer terminal and a connection terminal. The outer terminal and the connection terminal are the same as those of the first exemplary embodiment in structure, and a repeated description will not be provided.

A gasket 85 for sealing between the first terminal 81 and the cap plate 35 is inserted into a hole through which the first terminal 81 penetrates, and a lower insulation member 47 is provided under the cap plate 35 for electrical insulation of the first terminal 81 and the current collecting tab 41 from the cap plate 35.

A connection plate 83 is provided in the first terminal 81 to electrically connect the first terminal 81 with the cap plate 35. The first terminal 81 is fitted in the connection plate 83, and thus the connection plate 83 is electrically connected with the first terminal 81 through a connection tab 82 provided on an upper portion thereof.

The second terminal 91 is substantially the same as the second terminal of the first exemplary embodiment in structure. A short-circuit tab 93 is electrically formed in the second terminal 91, and accordingly the short-circuit tab 93 is provided on the cap plate 35. An upper insulation member 94 is provided between the short-circuit tab 93 and the cap plate 35 to electrically insulate the short-circuit tab 93 and the cap plate 35. The short-circuit tab 93 is electrically connected with the second terminal 91 through a connection tab 92 provided in an upper portion thereof, and the connection tab 92 is welded to the second terminal 91. The cap assembly 130 includes a short-circuit member 97 that short-circuits the positive electrode 11 and the negative electrode 12, and thus the short-circuit member 97 is electrically connected to the cap plate 35 that is electrically connected with the negative electrode 12 and the short-circuit member 97 is electrically connected with the short-circuit tab 93 electrically connected with the positive electrode 11 by being deformed when an internal pressure of the rechargeable battery 104 is increased (e.g., increased to a deformation pressure).

A short-circuit hole is formed in the cap plate 35, and the short-circuit member 97 is disposed between an insulation member 94 and the cap plate 35 in a short-circuit hole. The short-circuit member 97 may be formed of an arc-shaped portion convex downward and an inverse plate having an edge fixed to the cap plate 35.

A lower hole connected with the short-circuit hole is formed in a lower insulation member 48 and a valve member 481 that blocks the lower hole is formed in the lower hole. The valve member 481 controls connection between the short-circuit hole and an internal space of the case 26.

The valve member 481 is integrally formed with the lower insulation member 48, and a notch 481 is formed therein so as to be easily opened at a pressure (e.g., a predetermined pressure or an opening pressure).

FIG. 7 is a partial cut-away perspective view of a rechargeable battery according to a fifth exemplary embodiment. The fifth exemplary embodiment is substantially similar to the embodiment of FIG. 3, excluding a valve member 70' having a first portion 71' having a first thickness and a second portion having a second thickness, the second thickness being greater than the first thickness. The first portion 71' may be formed in a central region of the valve member 70' and the opening pressure of the valve member 70' can be suitably designed by modifying the size of the first portion 71' and the thicknesses of the first and second thicknesses.

FIG. 8 is a partial cross-sectional view of a rechargeable battery according to a sixth exemplary embodiment. The sixth exemplary embodiment is substantially similar to the embodiment of FIG. 4, excluding a valve member 73' having a first portion 73a' having a first thickness and a second portion having a second thickness, the second thickness being greater than the first thickness. The first portion 73a' may be formed in a peripheral region (e.g., along the circumference) of the valve member 73' and the opening pressure of the valve member 73' can be suitably designed by modifying the size of the first portion 73a' and the thicknesses of the first and second thicknesses.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Some Symbols | |
|---|---|
| 101, 102, 103, 104: rechargeable battery | 10: electrode assembly |
| 11: positive electrode | 11a: positive electrode uncoated region |
| 12: negative electrode | 12a: negative uncoated region |
| 13: separator | 21, 81: first terminal |
| 22, 91: second terminal | 23, 24: outer terminal |
| 25, 28: connection terminal | 25a: column portion |
| 25b: lower flange | 25c: lower protrusion |
| 26: case | 30, 130: cap assembly |
| 31, 35: cap plate | 32: electrolyte injection opening |
| 34: vent hole | 37: short-circuit hole |
| 38: sealing cap | 39: vent plate |
| 39a, 481a, 71, 73a, 74a: notch | 41, 42: current collecting tab |
| 43, 45, 47, 48, 72: lower insulation member | 43a, 72a: lower hole |
| 481, 70, 70', 73, 73', 74: valve member | 52, 61, 82, 92: connection tab |
| 53, 93: short-circuit tab | 53a: upper hole |
| 53b: reinforcing protrusion | 54, 94: upper insulation member |
| 55, 65, 85: gasket | 57, 97: short-circuit member |
| 59: sealing member | 62, 83: connection plate |
| 74b: sealing protrusion | |

What is claimed is:

1. A rechargeable battery comprising:
   an electrode assembly comprising a positive electrode and a negative electrode;
   a case having a cavity housing the electrode assembly;
   a cap plate having a short-circuit hole, the cap plate being coupled to the case;
   a short-circuit member in the short-circuit hole and configured to be deformed to electrically connect the positive electrode to the negative electrode; and
   a valve member between the short-circuit member and the electrode assembly.

2. The rechargeable battery of claim 1, wherein the valve member has a first portion having a first thickness and a second portion having a second thickness, the second thickness being greater than the first thickness.

3. The rechargeable battery of claim 2, wherein the first portion is located at a central portion of the valve member.

4. The rechargeable battery of claim 2, wherein the first portion is located at a peripheral portion of the valve member.

5. The rechargeable battery of claim 1, wherein the valve member has a notch.

6. The rechargeable battery of claim 1, wherein the valve member is configured to control a pressure connection between the short-circuit hole and an internal space of the cavity and wherein the valve member is configured to close the pressure connection when a cavity pressure of the cavity is below an opening pressure and to open the pressure connection when the cavity pressure exceeds the opening pressure.

7. The rechargeable battery of claim 6, wherein the opening pressure is greater than a deformation pressure at which the short-circuit member is deformed to electrically connect the positive electrode to the negative electrode.

8. The rechargeable battery of claim 7, wherein the opening pressure is 1.05 to 1.50 times the deformation pressure.

9. The rechargeable battery of claim 7, wherein a portion of the short circuit member is configured to protrude toward the electrode assembly when a pressure in the short-circuit hole is below the deformation pressure and to protrude away from the electrode assembly when the pressure in the short-circuit hole is greater than the deformation pressure.

10. The rechargeable battery of claim 1, further comprising:
- a terminal electrically connected to the electrode assembly, penetrating the cap plate, and protruding outside the case; and
- a lower insulation member electrically insulating the terminal from the cap plate and located at a side of the cap plate facing the electrode assembly, the lower insulation member having a lower hole overlapping with the short circuit hole, wherein the valve member seals the lower hole.

11. The rechargeable battery of claim 10, wherein the valve member is integrally formed with the lower insulation member.

12. The rechargeable battery of claim 10, wherein the valve member is formed of a film and is fixed to a side of the lower insulation member facing the electrode assembly.

13. The rechargeable battery of claim 10, further comprising a sealing member between the cap plate and the lower insulation member and encircling the short circuit hole.

14. The rechargeable battery of claim 10, wherein the valve member is formed of a film and is between the lower insulation member and the cap plate, the valve member having a sealing protrusion, the sealing protrusion encircling the short circuit hole.

15. The rechargeable battery of claim 1, further comprising a short-circuit tab adapted to contact the short-circuit member when the short-circuit member is deformed.

16. The rechargeable battery of claim 15, wherein the short circuit tab has a short-circuit protrusion protruding toward the short-circuit member.

17. The rechargeable battery of claim 16, wherein a portion of the short circuit tab has a hole overlapping the short-circuit hole and wherein the short-circuit protrusion is formed along a circumference of the hole of the short circuit tab.

18. The rechargeable battery of claim 15, wherein the cap plate, the short-circuit tab, and the short-circuit member are electrically connected to both the positive electrode and the negative electrode when the short-circuit member is deformed and contacts the short-circuit tab.

19. The rechargeable battery of claim 15, wherein the short-circuit tab is electrically connected to the negative electrode.

20. The rechargeable battery of claim 1, wherein the cap plate is electrically connected to the positive electrode.

* * * * *